(12) United States Patent
Staubli et al.

(10) Patent No.: US 8,414,944 B2
(45) Date of Patent: Apr. 9, 2013

(54) BREWING MACHINE WITH BREWING PISTON FOR INFUSION PREPARATION AND METHOD OF USING SAME

(75) Inventors: Christophe Staubli, Dottikon (CH); Markus Landolt, Zurich (CH)

(73) Assignee: Egro Coffee Systems AG, Dottikon (CH)

( * ) Notice: Subject to any disclaimer, the term of this patent is extended or adjusted under 35 U.S.C. 154(b) by 0 days.

(21) Appl. No.: 13/254,763

(22) PCT Filed: Mar. 2, 2010

(86) PCT No.: PCT/IB2010/050885
§ 371 (c)(1),
(2), (4) Date: Nov. 21, 2011

(87) PCT Pub. No.: WO2010/100600
PCT Pub. Date: Sep. 10, 2010

(65) Prior Publication Data
US 2012/0082774 A1   Apr. 5, 2012

(30) Foreign Application Priority Data

Mar. 6, 2009 (CH) .................... 0341/09
Mar. 19, 2009 (IT) .............. TO2009A0211

(51) Int. Cl.
*A47J 31/36*  (2006.01)

(52) U.S. Cl. ........ 426/431; 426/432; 426/433; 426/435; 99/302 P; 99/300; 99/315

(58) Field of Classification Search ............... 426/431, 426/432, 433, 435; 99/302 P, 300, 315
See application file for complete search history.

(56) References Cited

U.S. PATENT DOCUMENTS 5,007,333 A * 4/1991 Sager ............................ 99/286
2010/0080886 A1* 4/2010 Hourizadeh ................ 426/595

FOREIGN PATENT DOCUMENTS

| DE | 3316157 A1 | 11/1984 |
| EP | 1 535 554 A1 | 6/2005 |
| GB | 2 019 202 A | 10/1979 |

* cited by examiner

*Primary Examiner* — Anthony Weier
(74) *Attorney, Agent, or Firm* — Sughrue Mion, PLLC

(57) ABSTRACT

A brewing piston for infusion preparation, including a head associated with a filtering element, and a lateral surface having a first gasket in proximity to the head and a second gasket at a distance from the first gasket. The brewing piston includes a first conduit connected to the head and arranged to inject a liquid for infusion preparation, and a second conduit connected to the lateral surface between the gaskets and arranged to inject the liquid between the first gasket and the second gasket during infusion preparation. The piston is arranged to limit or avoid leaks in a machine for infusion preparation. Also included is a machine using the piston and a method of limiting or avoiding leaks in a machine for infusion preparation.

5 Claims, 5 Drawing Sheets

BREWING MACHINE WITH BREWING PISTON FOR INFUSION PREPARATION AND METHOD OF USING SAME

TECHNICAL FIELD

The present invention relates, in general, to a brewing piston for infusion preparation and to an infusion machine using the brewing piston.

In particular, the present invention relates to a brewing piston for a vertical type super-automatic machine arranged for infusion preparation, for example for coffee preparation.

Although in the following description reference is made to vertical type machines for coffee preparation, in which the infusion powder is coffee and the tamping of the coffee for preparing the infusion is made along a vertical axis, the present invention is also meant to be applicable, in general, to infusion machines for infusion preparation and to horizontal type infusion machines, in which, as known, the tamping is made along a substantially horizontal axis.

Moreover, the present invention is also applicable to infusion machines in which tamping occurs with an intermediate orientation between vertical and horizontal axis.

BACKGROUND ART

Super-automatic coffee machines are known in the art.

Super-automatic machines conventionally comprise machines in which it is provided that dosage of ground coffee and supply of coffee are controlled by the machine, whereby the latter may be activated by an operator or a user.

Super-automatic machines comprise, in general, a brewing assembly comprising an infusion chamber consisting of a brewing cylinder and two pistons, namely an upper piston or closing member and a lower piston.

In several working steps, the machine takes ground coffee, brews the coffee generating a brick of exhausted coffee powder and ejects the coffee brick. Then one of the pistons or both move(s) back to their resting position(s).

In its resting position the upper piston, in general, is not in the brewing cylinder and in some cases is not mobile; the lower piston moves by remaining inside the brewing cylinder both during the working steps and in its resting position.

According to the known art, each piston comprises one or more gaskets or sealing elements made of different materials. The upper piston comprises for instance at least one Turcon® gasket of known type and the lower piston comprises at least one silicone gasket.

A known problem, especially as far as the lower piston is concerned, is that the gasket or gaskets is or are not able to prevent leaks, that is to impede that some drops of liquid or water pass through the gasket(s): actually, on the one side, the sealing elements on the closing member and the lower piston are subjected to a strong thermal stress due to the high temperatures in the infusion chamber whereas, on the other side, especially the sealing element of the lower piston is exposed to an additional mechanical stress due to the piston movement relative to the cylinder.

Moreover, finely ground coffee powder, with a flour-like consistency, adheres to the inner wall of the cylinder of the infusion chamber and is tamped against the sealing element because of the pressure or over-pressure existing in the chamber, for instance 9-10 bars. While the piston(s) is (are) moving, such a mixture of hot water and coffee powder acts as an abrasive and this, jointly with the thermal stress, causes the sealing element(s) to become fragile or degraded, whereby the piston moves with difficulty and eventually it is no longer tightly guided in the cylinder.

In summary, for all the above reasons, leaks can frequently occur and the gasket(s) is (are) to be frequently replaced.

Such a known problem is particularly relevant in machines having important parts, such as for instance mechanical means for moving pistons, under the lower brewing piston.

The Applicant, in general, has noted that known brewing pistons do not effectively solve the problem of limiting or preventing leaks in a machine for infusion preparation, i.e. they do not solve the problem of impeding that some drop of water or coffee infusion powder pass through the piston gasket because of the gasket degradation.

DISCLOSURE OF THE INVENTION

The object of the present invention is thus to solve the problem outlined above, so that the drawbacks above are widely avoided and a considerably longer working life is achieved for the sealing elements.

According to the present invention, such an object is achieved by means of a brewing piston for coffee machines having the features set forth in the claims that follow.

The present invention relates moreover to a coffee machine comprising the brewing piston of the invention and to a method of limiting or preventing leakage in a machine for infusion preparation.

The claims are an integral part of the teaching of the present invention.

According to a feature of a preferred embodiment, the brewing piston comprises a brewing head, at least one first gasket and at least one second gasket, and at least one first conduit for injecting a liquid into the brewing head and at least one second conduit for injecting the liquid between the first gasket and the second gasket during infusion preparation.

According to another feature, the second conduit has an output hole or a size smaller than the corresponding output hole or size of the first conduit.

According to a further feature, the machine using the piston according to the present invention includes a cylinder in which the piston is displaceable and is arranged to position the piston in at least two positions:

a first position or resting position where the second gasket is held outside the cylinder and the first gasket is held inside the cylinder; and a second position or infusion position where both the first and the second gasket are held inside the cylinder.

BRIEF DESCRIPTION OF THE DRAWINGS

These and further features and advantages of the present invention will appear more clearly from the following detailed description of preferred embodiments, provided by way of non-limiting examples with reference to the attached drawings, in which components designated by the same or similar reference numerals indicate components having the same or similar functionality and construction and in which.

DESCRIPTION OF PREFERRED EMBODIMENTS

Figure 1:
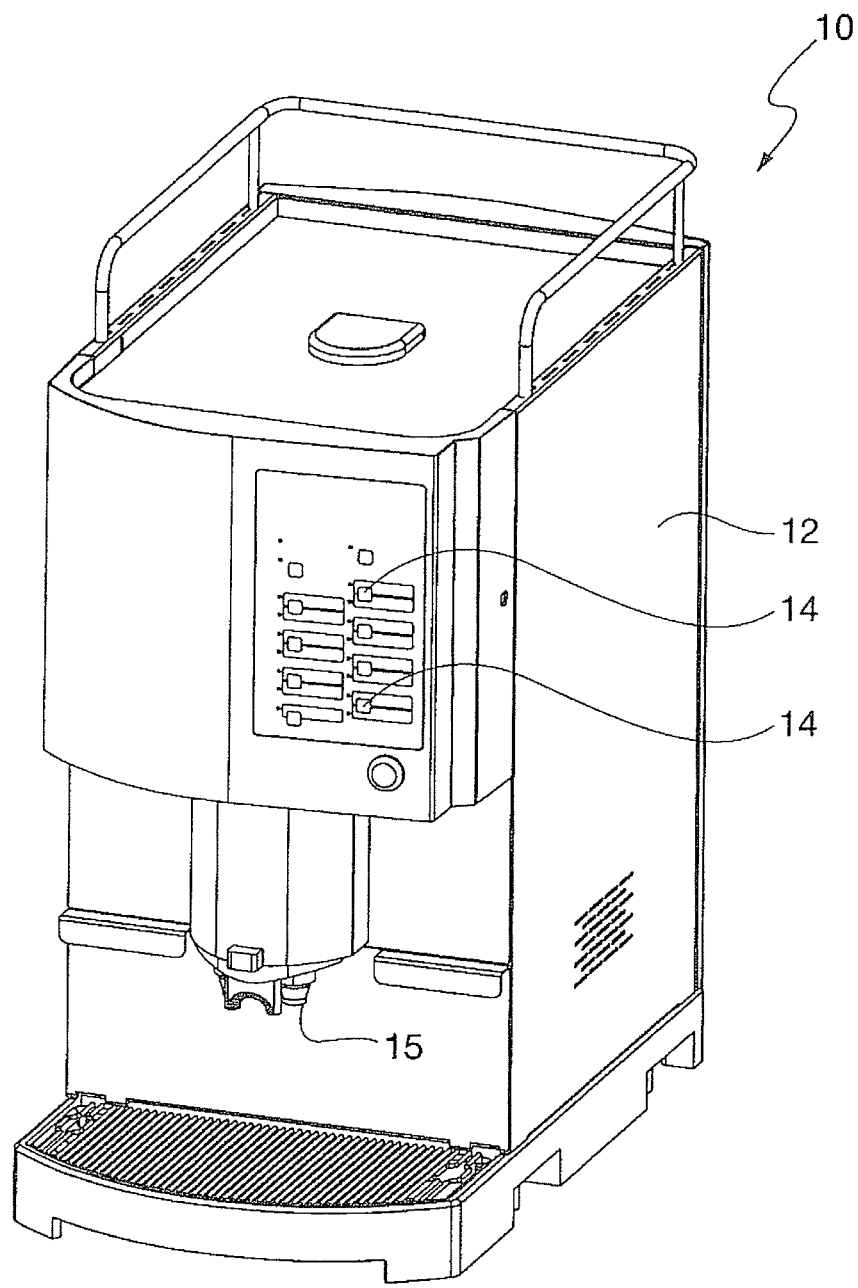
FIG. 1 shows a perspective view of a super-automatic coffee machine.
Figure 2:
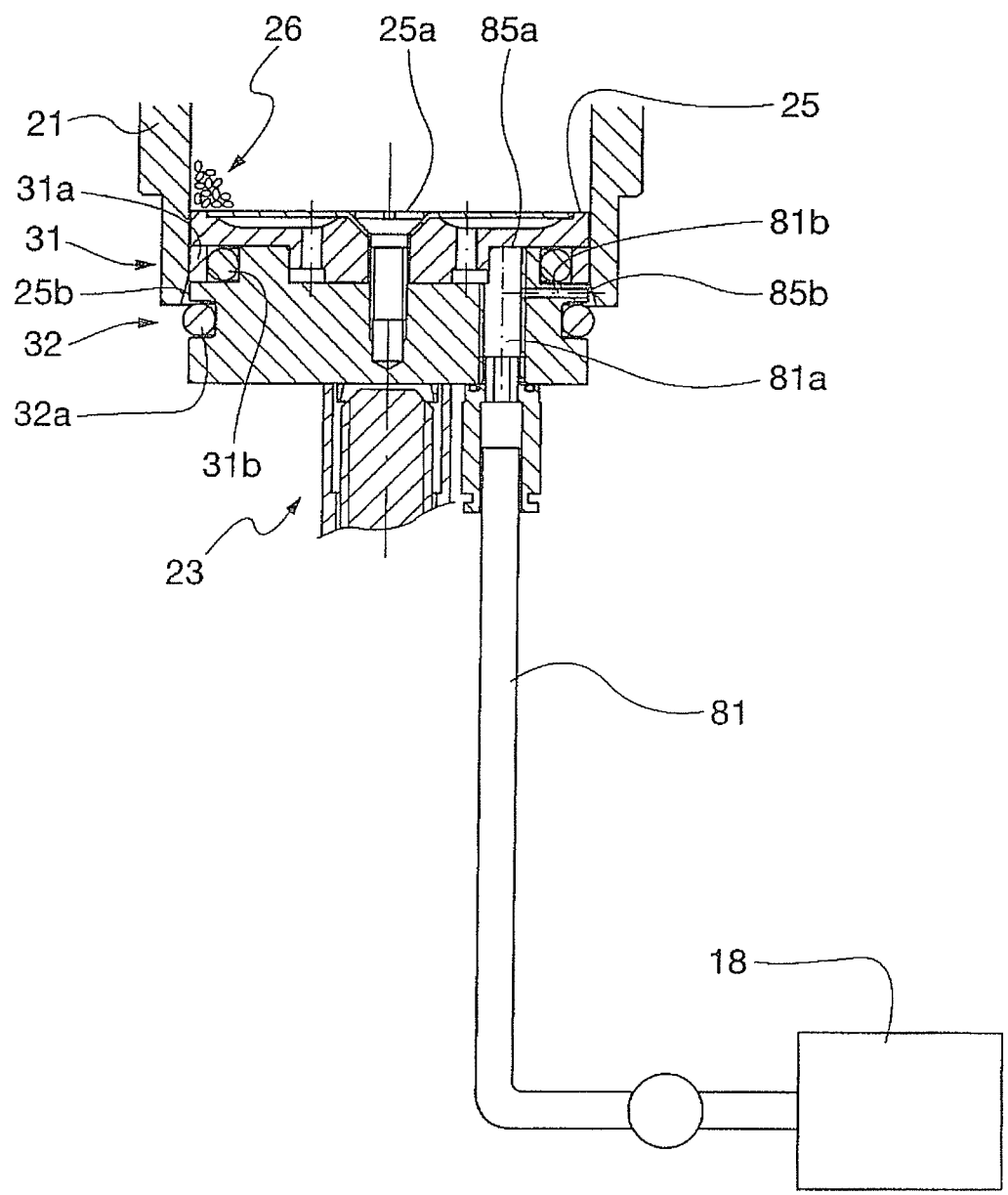
FIG. 2 shows a schematic view of a piston shaped according to a first embodiment of present invention.

With reference to FIG. 1, a machine 10 for infusion preparation, for instance a super-automatic espresso coffee machine, comprises a chassis 12, a plurality of keys 14 for operating the machine 10 and one or more supplying groups 15 arranged to supply, for instance, espresso coffee as a result of the activation of a key 14.

The machine 10 comprises, internally to the chassis 12, at least one boiler 18, of known type, at least one brewing cylinder 21 and at least one brewing piston 23, for instance a lower piston, arranged to move inside the cylinder 21.

The brewing piston (lower piston) 23 comprises, according to a preferred embodiment, a brewing head or upper surface 25 having a filter 25a and it is arranged to receive a liquid, for instance water, injected from the bottom for brewing the infusion powder 26, for instance ground coffee, in a known way.

The lower piston comprises, according to a preferred embodiment of the present invention, two gaskets or two groups of gaskets, 31 and 32 respectively, which preferably are arranged parallel to each other.

The first gasket 31 is located in proximity to the upper surface 25 and the second gasket 32 is located at a predetermined distance from the first gasket 31 downwards.

The first gasket comprises, for example, a Turcon® seal cap 31a of known type associated, preferably, with an O-ring 31b, for example a silicone O-ring, arranged to hold the Turcon® seal cap 31a in a flexible way.

Such a preferred embodiment of the first gasket (Turcon® type gasket) 31 is useful because the Turcon® seal cap 31 a is made of a solid sealing material, whereby the O-ring 31b takes over the task of buffering the Turcon® seal cap 31a when the piston 23 is moving in the brewing cylinder 21. The exemplifying first gasket 31 operates a good sealing against ground coffee but is prone to leakage in respect of liquids.

According to further embodiments, the first gasket 31 may be of any type and arranged to grant at least a good sealing to ground coffee.

The second gasket 32 comprises, preferably, an O-ring 32a, for example a silicone O-ring or a silicone gasket.

In use, when the cylinder 21 and the piston 23 are in resting state or position, the second gasket 32 preferably is held outside the brewing cylinder 21. Such a position is useful in order to avoid that the second gasket 32 is heated. As a matter of fact the thermal aging process of a gasket made, for instance, of silicone is reduced by avoiding the heating thereof.

Of course, according to further embodiments, the second gasket 32 may be of any type and arranged to grant a good sealing to water.

The boiler 18 is connected to the piston 23 by means of a main conduit 81, for instance a flexible conduit made of heat resistant plastic material.

According to the preferred embodiment, internally to the piston 23, the main conduit 81 divides into two conduits, a first conduit 81a and a second conduit 81b, respectively.

The first conduit 81a connects the main conduit 81 to the filter 25a and has a first size or comprises a first outlet hole 85a sized to inject the liquid (water) into the filter 25a.

The second conduit 81b connects the main conduit 81 to a lateral surface 25b of the piston 23 at a certain location between the gaskets, i.e. at a free space 25c located between the first gasket or group of gaskets 31 and the second gasket or group of gaskets 32.

In particular, the second conduit 81b has a second size or comprises a second hole 85b, preferably smaller than the first size or the first hole 85a. More preferably the ratio between the second hole 85b and the first hole 85a is between 0.4:1.

In use, when the cylinder 21 and the lower piston 23 are in the infusion position, as it will be disclosed later on in detail, the boiler 18 injects water into the main conduit 81 and, consequently, both into the filter 25a through the first hole 85a and in correspondence of the lateral surface 25b through the second hole 85b.

The injection of water into the space 25c between the gaskets 31 and 32 provides the following effects:

- the second gasket 32 protects against water leaks and thus against contamination due to coffee spouts in the machine;
- the water injected through the second hole 85b acts as a lubricant or glide and cleans the brewing cylinder 21;
- coffee powder, if any, remaining on the lateral surface 25 of piston 23 will be displaced by water that realises a film of water between the lateral surface 25b of piston 23 and the cylinder 21.

The above configuration is based on the principle that by lowering the pressure difference between the gaskets the leaks lower accordingly.

The operation of the machine 10 as disclosed above is the following.

Figure 3A:
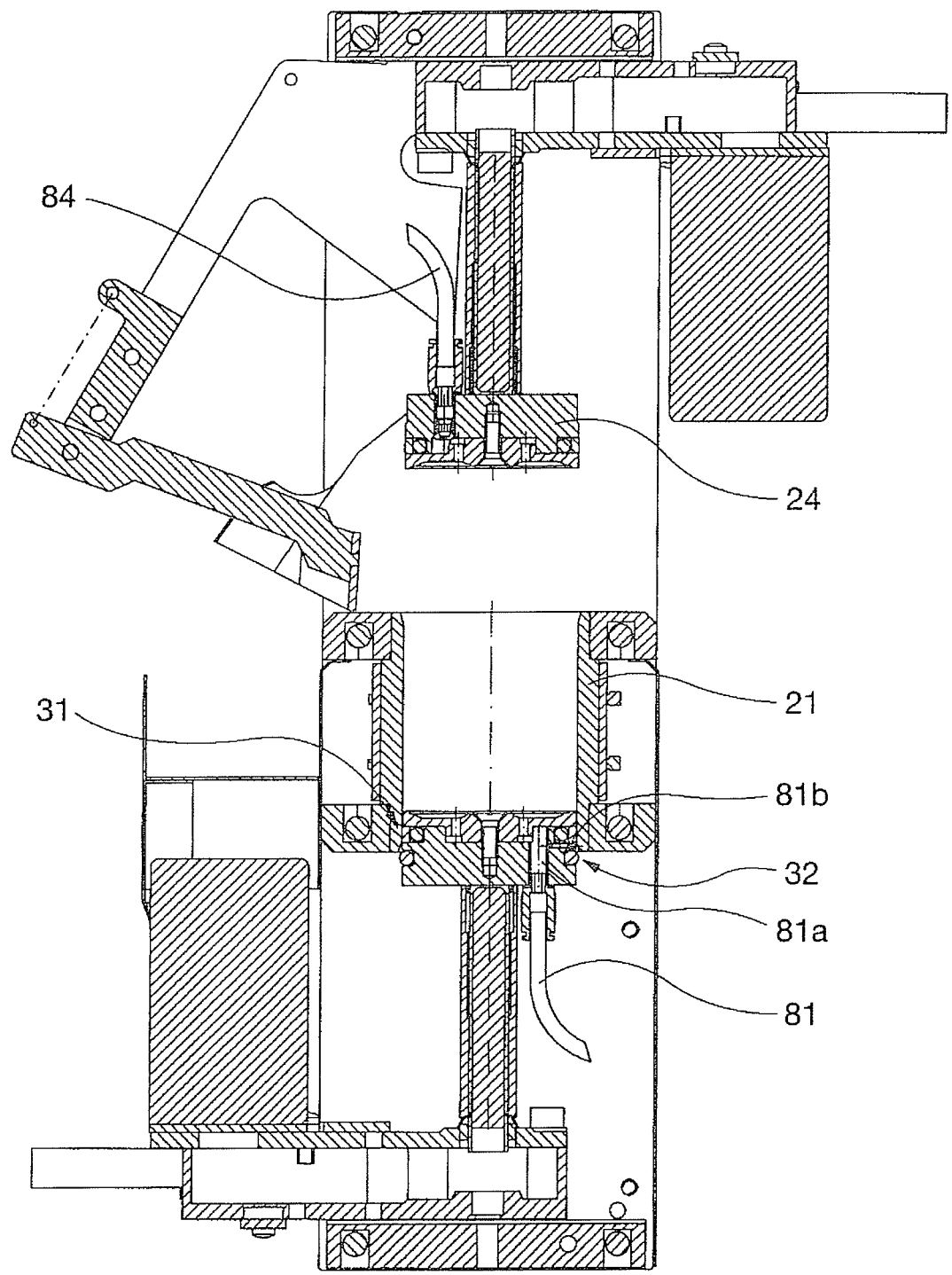
FIG. 3a and FIG. 3b show a sectional view of the piston according to the first embodiment in two operating positions.

Taking as a reference a generic infusion cycle, in a first step (load step), exemplified in FIG. 3a, the lower piston 23, mobile according to the preferred embodiment, and the cylinder 21 are in a relative and predetermined fixed position where, for instance, the first gasket or group of gaskets 31 is inside the cylinder 21 and the second gasket or group of gaskets 32 is outside the cylinder 21.

In the first step as exemplified, a second piston or upper piston 24, mobile according to the preferred embodiment, is located at a predetermined distance from the cylinder 21 whereby it is possible, by means of a load device of known type, to insert a certain amount of infusion powder 26 into the cavity obtained by means of the cylinder 21 and the lower piston 23.

Figure 3B:
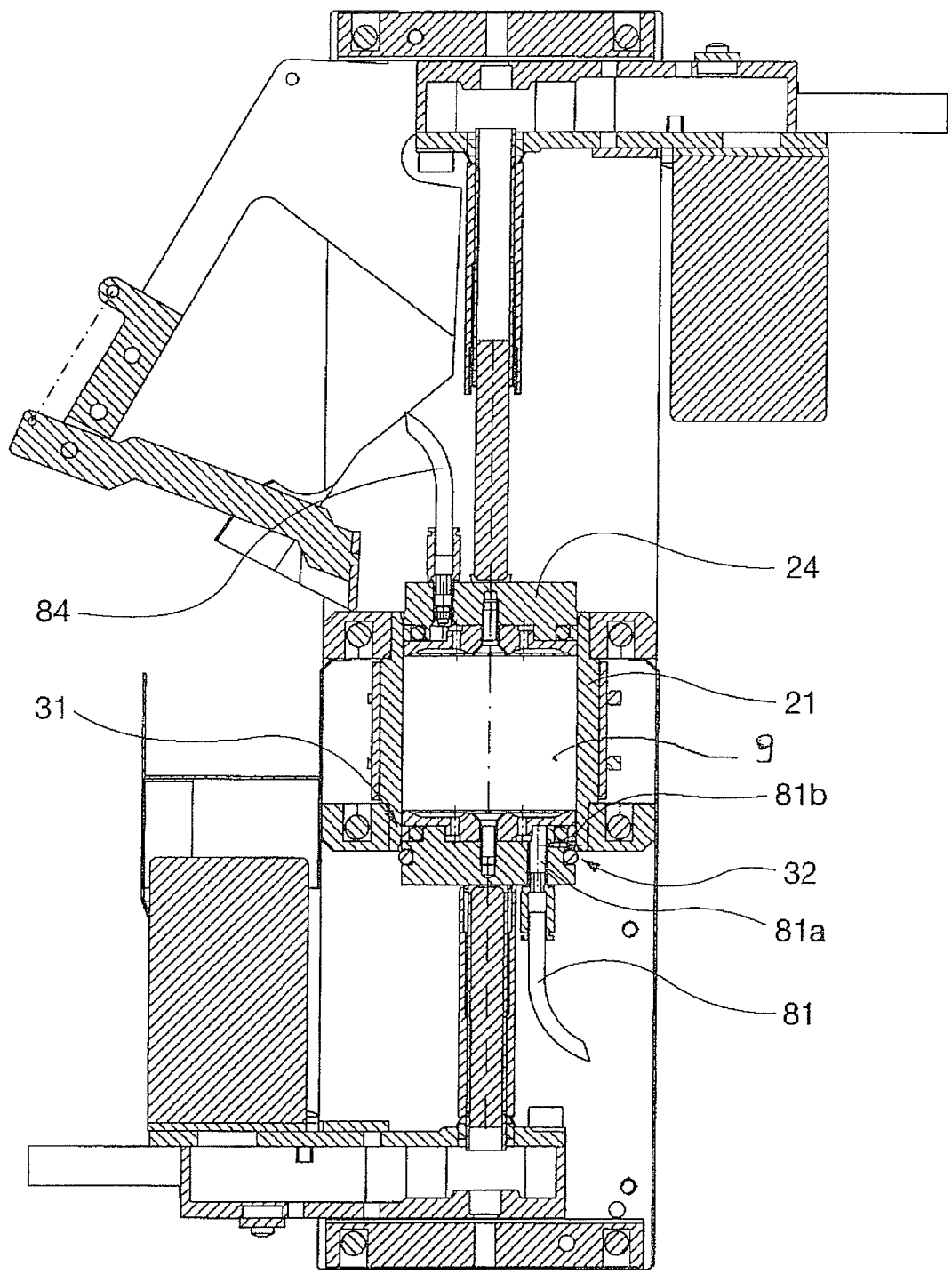
Figure 3C:
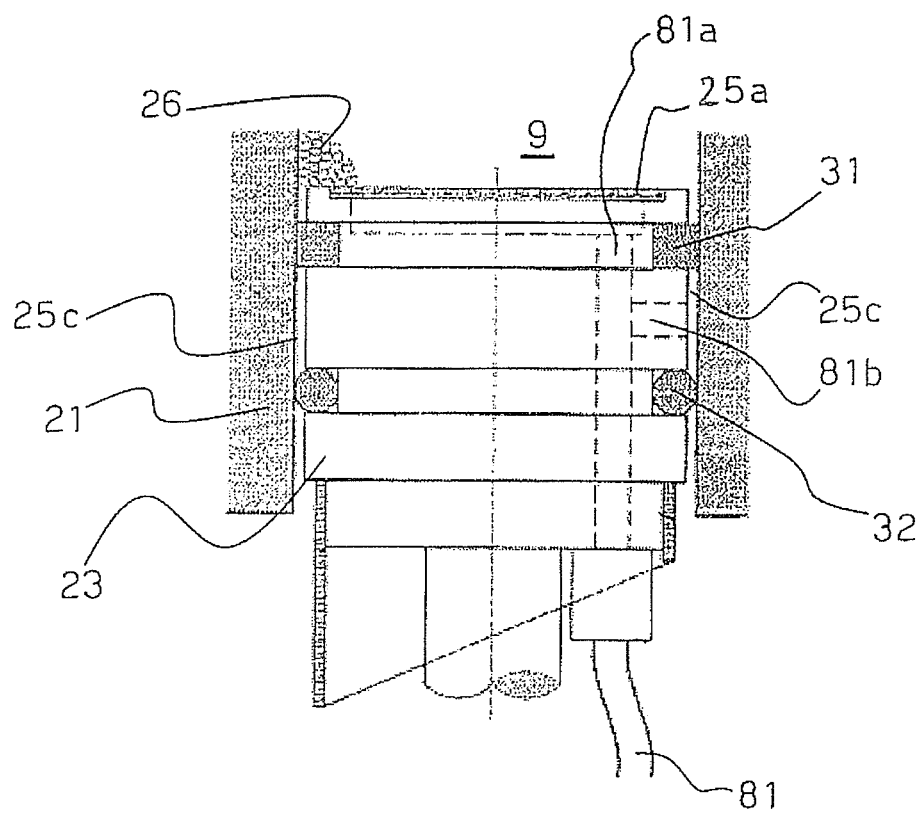
FIG. 3c schematically shows the piston located inside the cylinder in one of the operating steps.

In a second step (infusion preparation step), exemplified in FIGS. 3b and 3c, the lower piston 23 and the upper piston 24 are moved so that the upper piston 24 as well as the lower piston 23, together with the second gasket or group of gaskets 32, enter the cylinder 21.

Such a step may be described as a combination of two elementary steps, firstly a tamping step and secondly a real infusion step.

In particular, in the tamping step the lower piston 23 moves in the direction of the upper piston 24 and the upper piston moves in the direction of the lower piston so as to realise a closed cavity or infusion chamber 9 delimited by the cylinder 21 and by the pistons 23 and 24, respectively.

Once the tamping has been completed, flowing of pressurised hot water from the boiler 18 to the main conduit 81 through, for instance, a valve 87, is activated in a known way so as to obtain, thanks to the passage of the liquid through the first conduit 81a and the filter 25a, the supply of the infusion through the supplying group 15 connected, for instance, to the upper piston 24 by means of an output conduit 84, and the generation of an exhausted coffee brick to be ejected.

During the infusion step, when the cylinder 21 and the lower piston 23 are in the infusion position, the liquid is also injected into the second conduit 81b so that the pressurised water injected between the gaskets 31 and 32 lowers the pressure difference between the infusion chamber and the space between the gaskets and, consequently, the possible leaks.

According to the preferred embodiment, the injection of water through the conduit 81 is made, for example, at a pressure of 9-10 bars.

Water injected through the first conduit 81a and the filter 25a flows through the output conduit 84 to the supplying group 15 that is open.

Water injected through the second conduit 81b is sealed in the space between the gaskets 31 and 32, respectively, so as to be at a higher pressure than that at the output of the first conduit 81a, as easily comprehensible to a technician in the field.

Actually, in the infusion chamber 9, infusion water first accumulates, generates coffee infusion and is then discharged through the outlet, while water injected through the second conduit 81b is sealed in the annular space or chamber 25c between the gaskets 31 and 32.

Thus, the pressure in the infusion chamber 9 is always lower than both the pressure of supply water and the pressure in the annular chamber 25c. Consequently, the sealing element 31 is exposed only to a reduced pressure difference between the infusion chamber 9 and the annular chamber 25c and, in case of non-tightness of the sealing element 31, infusion water flows from the annular chamber 25c into the infusion chamber 9.

During the infusion step, in summary, water injected through the second conduit 81b will stay between the gaskets, 31 and 32, respectively, and will operate as a glide for the lower piston 23.

If there is a leak at the first or Turkon® gasket 31 of the lower piston 23, the water in the space between the gaskets flows toward the infusion chamber, thanks to the pressure difference. In any case, machine contamination is avoided and, as the water between the gaskets is the same water used for brewing the coffee, leaks at the first gasket 31, if any, do not cause contamination of the infusion powder 26.

In a third step (ejection step) the exhausted coffee brick is ejected in a conventional way, for instance by moving the upper and lower pistons 24 and 23 in the same direction and by activating an ejection device when the brick emerges from the cylinder 21.

Once the ejection step has been completed, the pistons return to the position described in relation to the first step.

During such return movement, the water, used as a glide, will be distributed in the space between the gaskets and completely used or discharged when the lower piston 23 is back in the resting position.

Actually, in the resting position, the second gasket 32 is preferably kept outside the cylinder so as to ensure the discharge of water injected between the first and the second gasket 31 and 32 during infusion preparation.

Therefore, thanks to the two conduits 81a and 81b, it is possible to obtain, in the space surrounding the infusion powder and in the space between the gaskets, pressures that are with a low difference.

Therefore during the infusion step, the gaskets need only to bear a low pressure difference with the result that the risk of leakage is strongly reduced or avoided.

Thanks to the two conduits 81a and 81b and to the two gaskets 31 and 32 arranged one on the other on the piston 23, and to the water supply into the annular chamber 25c inside the brewing cylinder 21, a considerable increase in the useful life of the piston tightness is achieved. In fact, the upper gasket 31 is to provide tightness only for a reduced pressure difference.

Advantageously, the upper gasket removes the coffee blend from the inner side of the brewing cylinder, so that the lower gasket does not come in contact with the coffee blend.

Moreover, the lower gasket is thermally stressed only during the infusion process. After the infusion process, such a gasket is outside the brewing cylinder and is not heated.

A further advantage of the piston according to the invention is that the inner wall of the brewing cylinder in the annular chamber 25c is wet by infusion water, which on the one side has a deterging effect and on the other side acts as a lubricant. Since the pressure in the annular chamber 25c is higher than the pressure in the infusion chamber 9, in case of non-tightness of the upper gasket 31 infusion water is directed into the infusion chamber 9.

The machine and the lower and upper pistons have been described by taking as reference a vertical type machine wherein the supplying group is connected to the upper piston and the liquid is injected from the bottom into the lower piston. As easily comprehensible to a technician in the field, the injection of the liquid may be effected from the top by reverting the pistons and the liquid injection.

Moreover, nothing prevents that the machine may have a different orientation from the vertical one, because the handling is anyway made by the motorised or non-motorised elements.

According to the preferred embodiment the lower and the upper pistons are mobile and the cylinder is stationary. As easily comprehensible to a technician in the field, in other embodiments one piston may be stationary and the other piston and/or the cylinder may be mobile.

The boiler has been described by taking as reference a single conduit connecting the boiler to the piston. As easily comprehensible to a technician in the field, the boiler can be connected to the piston by means of two conduits, a first one connecting the boiler to the filter, and the second one connecting the boiler to the conduit having the hole on the lateral surface of the piston between the gaskets.

Preferably, it is provided that one conduit is used for brewing coffee and the other for injecting water that will operate as a glide for the lower piston.

As easily comprehensible to a technician in the field, in other embodiments, more than one conduit may be used both for brewing coffee and for injecting water between the gaskets while maintaining, preferably, the feature that the second holes have a total size smaller than the total size of the first holes.

Of course, obvious changes and/or variations to the above disclosure are possible, as regards dimensions, shapes, materials, components, circuit elements and connections, as well as details of the described construction and operation method, without departing from the scope of the invention as defined by the claims that follow.

The invention claimed is:
1. Machine for infusion preparation comprising:
at least one boiler;
at least one cylinder;
at least one brewing piston having a relative motion as to the cylinder and comprising at least one first gasket and at least one second gasket, said second gasket being located at a predetermined distance from the at least one first gasket, said piston being arranged to receive from the boiler a liquid for infusion preparation;
said piston further comprising:

at least one first conduit connected to a brewing head for injecting the liquid through the brewing head for infusion preparation; and at least one second conduit arranged to receive the liquid from the boiler and connected to a lateral surface of said piston between the at least one first gasket and the at least one second gasket so as to inject the liquid between the at least one first gasket and the at least one second gasket during infusion preparation;

wherein the boiler is connected to the piston through a main conduit that divides into said at least one first conduit and into said at least one second conduit; and wherein said machine is configured for positioning said piston in at least two positions:

a first position or resting position wherein said at least one second gasket is held outside the cylinder and said at least one first gasket is held inside the cylinder; and a second position or infusion position wherein both said at least one second gasket and said at least one first gasket are held inside the cylinder.

2. Machine according to claim 1, characterised in that said second conduit has a size or an output hole smaller than the size of the first conduit or of a corresponding output hole.

3. Method for limiting or avoiding leakage in a machine for infusion preparation, said machine comprising at least one boiler, at least one cylinder, and at least one brewing piston having a relative motion as to the cylinder, and at least one said brewing piston having:

a brewing head and at least one first gasket and at least one second gasket, said second gasket being located at a predetermined distance from the at least one first gasket;

at least one first conduit arranged to inject the liquid for infusion preparation;

at least one second conduit arranged to inject the liquid between the at least one first gasket and the at least one second gasket during infusion preparation;

a main conduit that divides into said at least one first conduit and into said at least one second conduit and connected to said boiler;

the method being characterised by the step of:

positioning said piston in at least two positions:

a first position or resting position wherein said at least one second gasket is held outside the cylinder and said at least one first gasket is held inside the cylinder;

a second position or infusion position wherein both said at least one second gasket and said at least one first gasket are held inside the cylinder.

4. Brewing piston and cylinder according to claim 1, characterised in that said at least one first gasket (31) is a solid sealing gasket and said at least one second gasket (32) is a silicone gasket.

5. Brewing piston and cylinder according to claim 3, characterised in that said at least one first gasket is a solid sealing gasket and said at least one second gasket is a silicone gasket.

\* \* \* \* \*